US009081028B2

(12) United States Patent
Meyer

(10) Patent No.: US 9,081,028 B2
(45) Date of Patent: Jul. 14, 2015

(54) SCANNING PROBE MICROSCOPE WITH IMPROVED FEATURE LOCATION CAPABILITIES

(71) Applicant: Bruker Nano, Inc., Santa Barbara, CA (US)

(72) Inventor: Charles Meyer, Goleta, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 14/386,511

(22) PCT Filed: Mar. 19, 2013

(86) PCT No.: PCT/US2013/032957
§ 371 (c)(1),
(2) Date: Sep. 19, 2014

(87) PCT Pub. No.: WO2013/142489
PCT Pub. Date: Sep. 26, 2013

(65) Prior Publication Data
US 2015/0082498 A1   Mar. 19, 2015

Related U.S. Application Data

(60) Provisional application No. 61/612,472, filed on Mar. 19, 2012.

(51) Int. Cl.
G01Q 10/04         (2010.01)
G01Q 30/04         (2010.01)
G01Q 60/30         (2010.01)
(Continued)

(52) U.S. Cl.
CPC ............. *G01Q 10/00* (2013.01); *G01Q 30/02* (2013.01); *G01Q 40/00* (2013.01); *G01Q 60/38* (2013.01); *B82Y 35/00* (2013.01)

(58) Field of Classification Search
CPC ...... B82Y 35/00; B82Y 20/00; G01Q 10/065; G01Q 10/04; G01Q 10/00; G01Q 20/00; G01Q 20/02; G01Q 30/04; G01Q 60/30; G01Q 40/00; G01Q 70/00; G01Q 90/00
USPC .......................... 850/1, 2, 3, 5, 6, 63; 250/307
See application file for complete search history.

(56) References Cited

U.S. PATENT DOCUMENTS 5,173,605 A * 12/1992 Hayes et al. ..................... 850/1
5,412,980 A    5/1995 Elings et al.
(Continued)

FOREIGN PATENT DOCUMENTS

WO    2008/156474 A1   12/2008

*Primary Examiner* — David A Vanore
(74) *Attorney, Agent, or Firm* — Boyle Fredrickson, S.C.

(57) ABSTRACT

An SPM assembly includes an SPM and a wide field image acquisition device that can be used to rapidly locate a region of interest and position that region within a SPM scan range of 100 microns or less. The wide field image acquisition device may include a low resolution camera having wide field of view in excess of 12 mm, and a high magnification camera having a field of view in the single mm range. Alternatively, a single camera could be used if it has sufficient zoom capability to have functionalities commensurate with both cameras. Collocation preferably is employed to coordinate translation between the low magnification and high magnification cameras (if separate cameras are used) and between the high magnification camera and the SPM.

31 Claims, 8 Drawing Sheets

(51) Int. Cl.
  *G01Q 10/00* (2010.01)
  *G01Q 30/02* (2010.01)
  *G01Q 40/00* (2010.01)
  *G01Q 60/38* (2010.01)
  *B82Y 35/00* (2011.01)

(56) References Cited

U.S. PATENT DOCUMENTS

| | | | |
|---|---|---|---|
| 5,448,399 A | 9/1995 | Park et al. | |
| 5,705,814 A * | 1/1998 | Young et al. | 850/2 |
| 7,615,738 B2 | 11/2009 | Kley | |
| 8,474,060 B2 * | 6/2013 | Phan et al. | 850/1 |
| 8,646,109 B2 * | 2/2014 | Hu et al. | 850/1 |
| 8,650,660 B2 * | 2/2014 | Shi et al. | 850/5 |
| 8,739,309 B2 * | 5/2014 | Hu et al. | 850/5 |
| 8,782,810 B2 * | 7/2014 | Masser | 850/1 |
| 8,782,811 B2 * | 7/2014 | Kindt et al. | 850/63 |
| 8,869,310 B2 * | 10/2014 | Ruiter et al. | 850/1 |
| 8,904,560 B2 * | 12/2014 | Shi et al. | 850/3 |
| 8,997,259 B2 * | 3/2015 | Su et al. | 850/13 |
| 2007/0251305 A1 * | 11/2007 | Huang et al. | 73/105 |
| 2009/0032706 A1 * | 2/2009 | Prater et al. | 250/307 |
| 2011/0107471 A1 * | 5/2011 | Masser | 850/1 |
| 2011/0167524 A1 * | 7/2011 | Hu et al. | 850/1 |
| 2012/0131702 A1 * | 5/2012 | Shi et al. | 850/1 |
| 2012/0278957 A1 * | 11/2012 | Phan et al. | 850/33 |
| 2014/0223615 A1 * | 8/2014 | Shi et al. | 850/5 |
| 2014/0259234 A1 * | 9/2014 | Raschke et al. | 850/1 |
| 2014/0283228 A1 * | 9/2014 | Su | 850/1 |
| 2014/0283229 A1 * | 9/2014 | Hu et al. | 850/5 |
| 2014/0289912 A1 * | 9/2014 | Andreev | 850/18 |
| 2015/0074859 A1 * | 3/2015 | Ruiter et al. | 850/13 |
| 2015/0082498 A1 * | 3/2015 | Meyer | 850/1 |

* cited by examiner

SCANNING PROBE MICROSCOPE WITH IMPROVED FEATURE LOCATION CAPABILITIES

CROSS-REFERENCE TO RELATED APPLICATION

The present application is a national phase application of PCT/US13/32957, which was filed on Mar. 19, 2013, and which claims priority under 35 USC §1.119(e) to U.S. Provisional Patent Application Ser. No. 61/612,472, filed Mar. 19, 2012 and entitled "Scanning Probe Microscope With Improved Feature Location Capabilities", the subject matter of which is hereby incorporated by reference in its entirety.

BACKGROUND OF THE INVENTION

1. Field of the Invention

The invention relates to scanning probe microscopes (SPMs) and, more particularly, relates to a SPM that facilitates the location and data acquisition from a small region of interest on the order of microns from a large sample and to a method of operating such an SPM 2. Description of the Related Art Scanning probe microscopes (SPMs), such as the atomic force microscope (AFM), are devices which typically use a tip and low tip-sample interaction forces to characterize the surface of a sample down to atomic dimensions. Generally, SPMs include a probe having a tip that is introduced to a surface of a sample to detect changes in the characteristics of a sample. By providing relative scanning movement between the tip and the sample, characteristic data can be acquired over a particular region of the sample and a corresponding map of the sample can be generated.

The atomic force microscope (AFM) is a very popular type of SPM. The typical AFM employs a probe having a cantilever and a tip. A scanner generates relative motion between the probe and a sample while the probe-sample interaction is monitored. In this way, images or other measurements of the sample can be obtained. The scanner typically includes one or more actuators that usually generate motion in three orthogonal directions (XYZ). The probe is often coupled to an oscillating actuator or drive that is used to drive probe at or near a resonant frequency of cantilever. Alternative arrangements measure the deflection, torsion, or other motion of cantilever. A controller generates control signals to maintain either a relative constant interaction between the tip and sample or a constant deflection of the cantilever. Measurement involves controlling the scanner to move either the sample or the probe up and down relatively perpendicular to the surface of the sample under feedback. The scanner may be either a "sample scanner" that supports the sample or a "tip scanner" that support the probe. In any event, a translation stage may be provided for additionally translating the sample in at least X Andy and possibly Z to position the sample beneath the probe. The scanner is controlled to perform a scan operation by effecting relative probe-sample motion in an "x-y" plane that is at least generally parallel to the surface of the sample. Note that many samples have roughness, curvature and tilt that deviate from a flat plane, hence the use of the term "generally parallel." The term "parallel" may also be used herein and should be construed to also mean "generally parallel." The scan typically takes the form of a raster scan in which data is taken along lines in the X direction that are closely spaced in the Y direction. The maximum length of the lines in the X direction is known as the "scan range." In this way, the data associated with this vertical motion can be stored and then used to construct an image of the sample surface corresponding to the sample characteristic being measured, e.g., surface topography.

Many SPMs are incorporated into an SPM assembly that additionally has an integrated optical microscope including a high resolution camera to facilitate navigation of the sample with respect to the SPM. The camera and associated optics (simply referred to as a camera herein for the sake of simplicity) typically have a relatively narrow field of view on the order of 1 to 2.5 mm. The camera typically provides a video image that may itself be recorded and manipulated.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

The most broadly adopted commercial SPMs usually require a total scan time of several minutes to cover an area of several square microns at medium-high resolution (e.g. 512× 512 pixels), low tracking force, and high image quality. At even higher data densities, such as 1024×1024 and above, data density is sufficiently high permit one to zoom in on captured data and still have enough data density to be useful. Extremely high data density of 5,000×5,000 pixels produces images of exceptional quality, but such scans take 83 minutes at 1 Hz scan speeds. In general, the practical limit of SPM scan speed is a result of the maximum speed at which the SPM can be scanned while maintaining a tracking force that is low enough not to damage the tip and/or sample or to at least limit the damage to the tip and/or sample to acceptable levels.

However, recent work in high-speed SPM has been performed by a number of groups. This work has culminated in the assignee's development of an AFM that can scan large ranges very rapidly with high resolution. Scan speeds in excess of 10 Hz are possible while still maintaining extremely high resolution and preserving tip integrity.

One drawback of existing AFM and other SPM designs, including the recently developed high-speed, high resolution AFM developed by the assignee, is that locating a feature of interest on a sample using the camera of an AFM assembly and acquiring usable data from that feature using the AFM probe can be a very time-consuming process requiring a high level of skill on the part of the AFM operator. This drawback is due in part to the fact that the optics employed in current AFMs, while having a relatively high magnification range, necessarily have only a narrow field of view on the single mm scale. This problem is exasperated by the fact that locating a region of interest within that field of view using the AFM proper can be a difficult and/or time consuming process. In addition, the AFM microscope tends to obscure the sample, making visual observation of the sample location under the AFM difficult.

Specifically, referring to the flowchart of FIG. 1, the typical process 110 for acquiring data from a sample proceeds from START in Block 112 to Block 114, where the user places the sample on the support or "chuck" of the AFM assembly that is itself supported on the translation stage. The sample may be quite large—on the order of more than 150 mm in diameter and even substantially larger. The feature of interest on that sample typically will be found in an "area of interest" of no more than a few millimeters, and the feature of interest itself often will be in a "region of interest" having a size of the nanometer size range, typically between 100 nm to 10 microns and, thus, is far too small to be seen with the naked eye.

Next, in Block 116, the user manually operates the translation stage to attempt to position the area of interest within the field of view of the AFM assembly's camera assembly's optics while manually peering between the camera and the underlying chuck. The user then views the video image from the camera in Block 118 and determines in Block 120 whether the area of interest is within the AFM assembly's optical field of view. The area of interest might not be visible at this time, even if it is nominally within the optical field of view, if the camera is out of focus and/or the instrument's illumination is set incorrectly. The user thus may have to adjust the focus of the camera and/or alter the illumination to even determine whether or not the area of interest is within the camera's field of view. The AFM probe usually is mounted so as to move up and down with the camera. If the sample has no features visible in the video image, the user may move the camera too close to the sample and ram it into the sample surface while attempting to focus the camera, resulting in potential damage to the probe. Hence, once again, considerable skill and some level of luck are required for this step.

After these adjustments, if the area of interest is not found in Block 120, the user has to move the translation stage to a new position and repeat the operations of Blocks 116-120 until the area of interest is located in the camera's field of view in Block 120. (For small samples, the area itself may be considered the region of interest). The area of interest may be found, for example, by noting a change in contrast between the area of interest and the surrounding portions of the sample surface.

Next, in Block 122, the user manually moves the translation stage while viewing the video image to center the area of interest within the AFM assembly camera's optical field of view.

Next, in Block 124, the user engages the AFM's probe and operates the AFM it to scan the feature of interest while acquiring high density data of on the order of 512×512 pixels or above. This is no small feat given the fact that the time required to scan the entire area of view of an AFM typically prohibits scanning the entire area using a high data density scan of on the order of 1024×1024 pixels or higher and then acquiring data from the feature of interest from the scanned data. Such an operation typically would take nearly an hour using current AFM technology. It would take considerably longer, in fact in excess of 83 minutes, if an extremely high density scan of on the order of 5000×5000 pixels were performed.

The most commonly employed alternative to this procedure is a so-called "pan and zoom" technique. In this technique, the user scans a relatively small area of, e.g., 10×10 microns within the AFM's scan range and analyzes the data in that area to determine whether the feature of interest has been captured. If not, the user repeats this process in randomly distributed or a methodically determined pattern of scan areas within the area of interest until the region of interest is located. Some users perform each 10×10 micron scan at a mid-density level of, e.g., 256×256 pixels, taking about 4 minutes, until the feature of interest is found. They then perform a higher density scan of the small area that contains the region of interest after the feature of interest is located.

A third alternative that essentially is a combination of the first two alternatives is to first capture a large, very low density (on the order 128×128 pixel) survey scan of the entire scannable area to attempt to locate the feature of interest and, upon locating that feature, zooming into the region of interest containing the feature of interest and capturing a smaller, high data density image of the region containing that feature. This alternative may be considerably faster than the first alternative but risks missing the feature of interest entirely if the data density of the survey scan is too low to find that feature.

Regardless of the technique used to acquire the high data density scan of the feature of interest, the resulting image data of that feature is captured and analyzed in Block 126, and the routine returns to END in Block 128.

Depending upon factors such as the skill level of the operator, the success the operator has in locating the area of interest within the sample, the region of interest in that area, and the technique employed to capture data from the area of interest, the above-described process can take anywhere from many minutes to over an hour from the initiation of the process to the capture and analysis of the high density image data of the feature of interest. It can fail altogether if the operator is insufficiently skilled. In addition, scanner drift and/or changes in sample feature attributes, such as location, size, and shape, occurring between the time that the feature of interest is located and the time that the data concerning that feature is acquired and analyzed can lead to acquisition of out-of-date data and image distortion.

Hence, the need exists to provide a SPM system and process that are capable of rapidly locating a region of interest on a sample and obtaining and analyzing data concerning that region, preferably within a matter of minutes.

The need additionally exists to provide a SPM system and process that permit a relatively unskilled operator to capture and analyze data concerning a small region of interest on a sample surface while minimizing or eliminating risk of damage to the SPM.

SUMMARY OF THE INVENTION

In accordance with the first aspect of the invention, one or more of the above and other needs are realized by using a wide field image acquisition device to rapidly locate a region of interest on a large sample stage with one or plural samples and to position that region of interest within the SPM probe's scan range area. The wide field image acquisition device has a field of view having a maximum dimension in excess of 12 mm to facilitate viewing of all or a significant portion of a large sample stage with one or plural samples in a single image. A preferred process includes, using the wide field image acquisition device, locating a region of interest on the sample surface having maximum dimension of less than 200 microns, then effecting relative sample/SPM assembly movement to position the region of interest within the scan range of the SPM, and then scanning the region of interest with a probe of the SPM and acquiring data while monitoring interaction between the probe and the sample. The region of interest is contained in a larger area of interest having a maximum dimension of no more than about 10 mm.

The wide field image acquisition device may be an instrument that acquires non-optical images such as thermal or microwave images. It also could comprise an optical instrument.

If the wide field image acquisition device is an optical instrument, the optical instrument may include 1) "snapshot" or low magnification, wide field camera having a field of view in excess of 12 mm and more preferably in excess of 50 mm, and 2) a "video" or high magnification camera having a narrow field of view in the single mm range and in any event less than 10 mm. In this case, the first locating step comprises 1) locating the area of interest using the first camera, 2)

positioning the area of interest within field of view of the second camera, and 3) using the second camera, locating the region of interest.

Alternatively, the optical instrument may be a zoomable camera, and the step of locating the region of interest may comprise first locating an area of interest on the sample surface, the area of interest containing the region of interest and having a maximum dimension of no more than about 10 mm, then zooming in on the area of interest and locating the region of interest within the area of interest.

Optical instruments having three or more cameras also could be provided.

Regardless of the sizes of the fields of view of the respective instrument, each wider field instrument should have a resolution at least as small, and preferably at least about ten times smaller, than the field of view of the associated narrower field instrument. Hence, in a two camera system, the low magnification camera preferably has a resolution at least ten times smaller than the field of view of the high magnification camera, and the high magnification camera preferably has a resolution at least 10 times smaller than the scan range of the SPM.

The region of interest is collocated in the various images to coordinate translation between the low magnification and high magnification cameras (if separate cameras are used) and between the high magnification camera and the SPM probe. Collocation also can permit a user to visually move between views with ease while viewing a specific region of interest. This collocation is made possible by calibrating the system to accommodate offsets between the camera(s) and the SPM relative to one another.

An SPM assembly capable of performing at least some of these processes also is provided.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof. It is hereby disclosed that the invention include all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
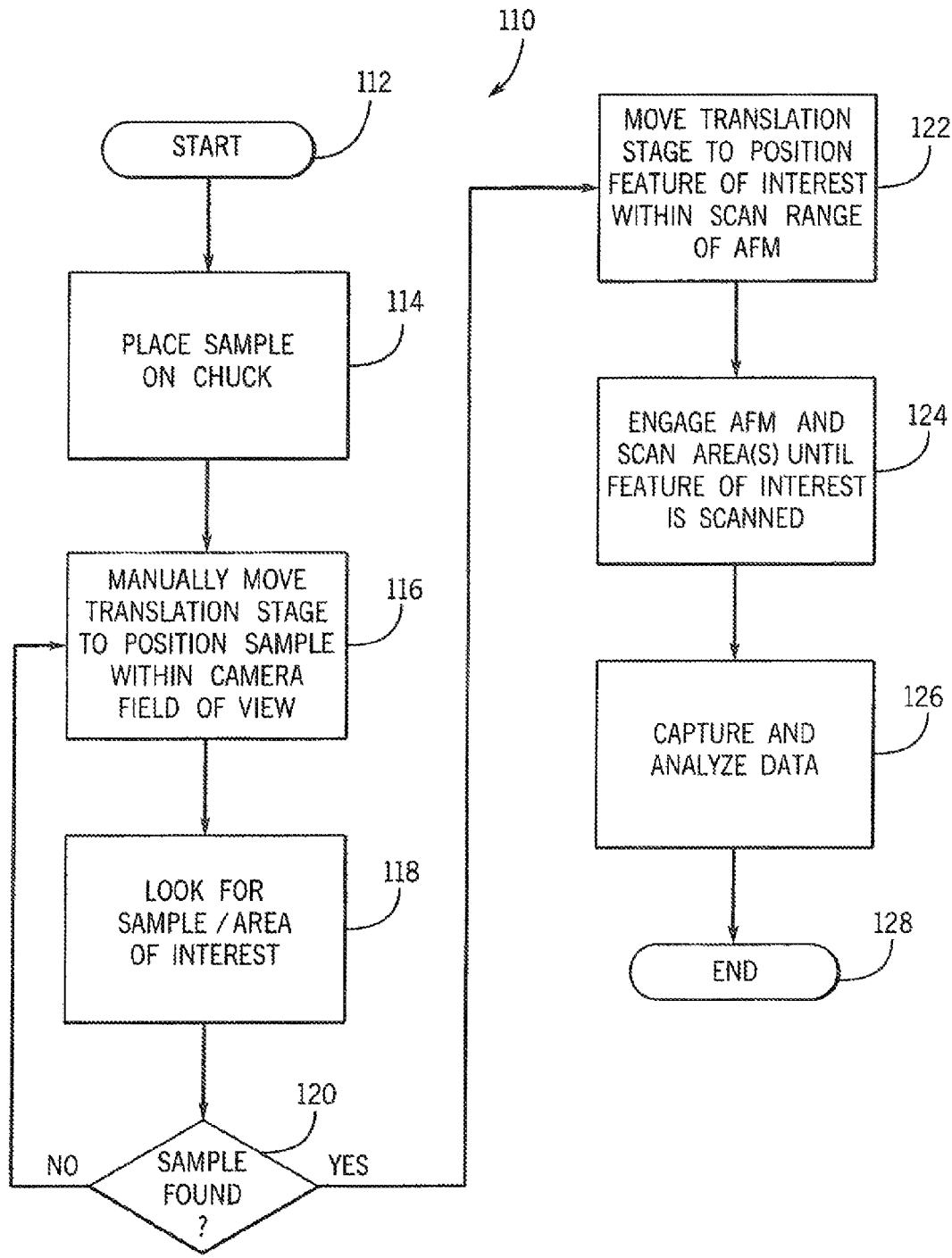
FIG. 1 is a flowchart of a process for acquiring high density data concerning a feature of interest on a sample using a SPM assembly according to the prior art, the flowchart being appropriately labeled ("PRIOR ART")
Figure 2:
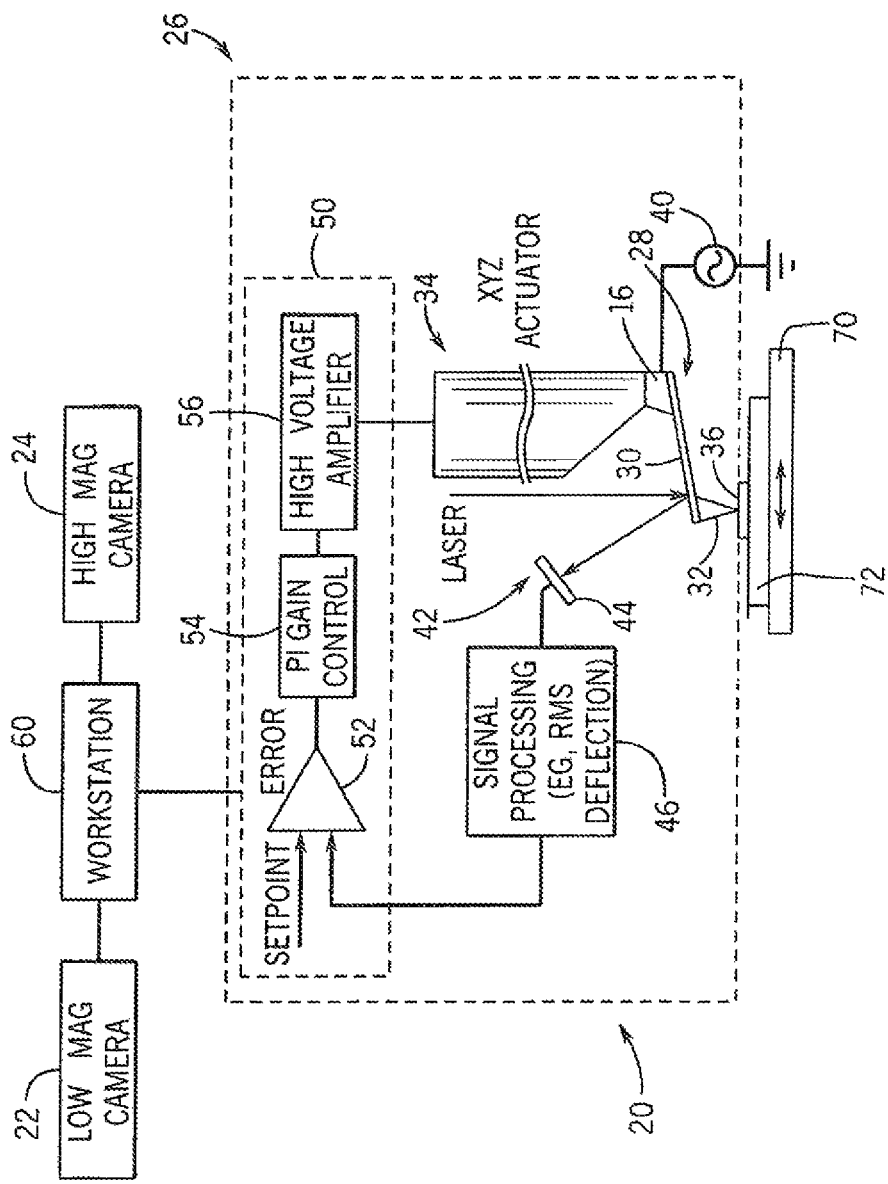
FIG. 2 is a schematic block diagram of a SPM assembly constructed in accordance with an embodiment of the present invention and having a wide view camera, a narrow view camera, and a SPM.
Figure 3:
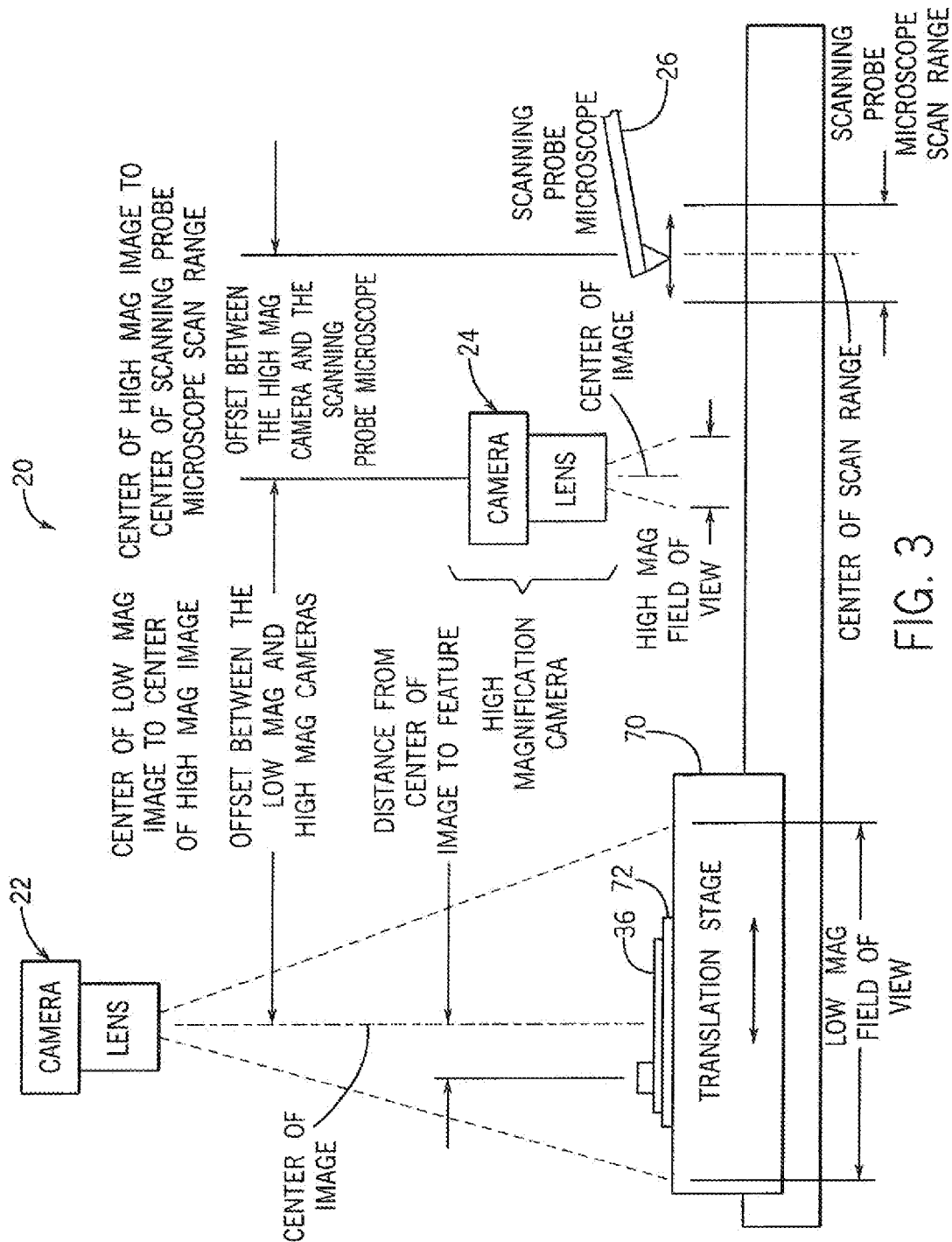
FIG. 3 schematically illustrates operation of the SPM assembly of FIG. 2.

Referring now to the drawings and initially to FIGS. 2 and 3 in particular, an SPM assembly 20 constructed in accordance with the preferred embodiment of the invention is illustrated schematically. The SPM assembly 20 includes a wide-field image acquisition device and a SPM 26. The wide-field image acquisition device could acquire images non-optically such as thermally or using microwaves. In the illustrated embodiment the wide-field image acquisition instrument is an optical instrument having at least one camera. In this particular embodiment, the optical instrument is a two-camera system including a low magnification camera 22 and a high magnification camera 24. All three instruments 22, 24, and 26 are positioned over a translation stage 70.

Referring to FIG. 2, SPM 26 preferably comprises an AFM. AFM 26 employs a probe device including a probe 28 having a cantilever 30 and a tip 32 mounted or formed on or near the free end of the cantilever. A scanner 34 generates relative motion between the probe 28 and a sample 36 while the probe-sample interaction is measured. (The term "sample" as used herein should be construed to encompass either an individual sample or plural samples provided on a common sample stage.) In this way, images or other measurements of the sample can be obtained. Scanner 34 is typically comprised of one or more actuators that usually generate motion in three mutually orthogonal directions (X, Y, Z). Often, scanner 34 is a single integrated unit that includes one or more actuators to move either the sample or the probe in all three axes, for example, a piezoelectric tube actuator. Alternatively, the scanner may be a conceptual or physical combination of multiple separate actuators. Some AFMs separate the scanner into multiple components, for example an XY actuator that moves the sample and a separate Z-actuator that moves the probe. The instrument is thus capable of creating relative motion between the probe 28 and the sample 36 while measuring the topography or some other property of the sample as described, e.g., in Hansma et al. U.S. Pat. No. RE 34,489; Elings et al. U.S. Pat. No. 5,266,801; and Elings et al. U.S. Pat. No. 5,412,980.

Scanner 34 often comprises a piezoelectric actuator (often referred to herein as a "piezo") such as a piezoelectric tube or a piezoelectric stack that is used to generate relative motion between the measuring probe and the sample surface. A piezo is a device that moves in one or more directions based on voltages applied to electrodes disposed on the piezo. Piezos are often used in combination with mechanical flexures that serve to guide, constrain, and/or amplify the motion of the piezos. Most typically, an actuator assembly is provided in the form of an XY-actuator that drives the probe or sample in a horizontal, or XY-plane and a Z-actuator that moves the probe or sample in a vertical or Z-direction. The scanner 34 preferably has a lowest fundamental resonant frequency in excess of 2 kHz. It preferably has at least an approximately 30 micrometer scan range with a force control slew rate of at least 1 mm per second. Larger scan ranges of up to 100 microns may be possible, albeit at the cost of a lower resonant frequency and a lower slew rate.

In a common configuration, probe 28 is coupled to an oscillating actuator or drive 40 that is used to drive probe 28 to oscillate at or near a resonant frequency of cantilever 30. Alternative arrangements measure the deflection, torsion, or other characteristic of cantilever 30.

The probe 28 may be oscillated and brought into contact with sample 36 as sample characteristics are monitored by detecting changes in one or more characteristics of the oscillation of probe 28, as described above. In this regard, a deflection detection apparatus 42 is typically employed to direct a beam towards the backside of probe 28, the beam then being reflected towards a detector 44, such as a four quadrant photodetector. The deflection detector is often an optical lever system such as described in Hansma et al. U.S. Pat. No. RE 34,489, but may be some other deflection detector such as strain gauges, capacitance sensors, etc. The sensing light source of detection apparatus 42 is typically a laser, often a visible or infrared laser diode. The sensing light beam generated by the sensing light source can also be generated by other light sources, for example a He—Ne or other laser source, a superluminescent diode (SLD), an LED, an optical fiber, or any other light source that can be focused to a small spot.

As the beam translates across detector 42, appropriate signals are processed by a signal processing block 46 (e.g., to determine the RMS deflection of probe 28). The interaction signal (e.g., deflection) is then transmitted to a controller 50, which processes the signals to determine changes in the oscillation of probe 28. In general, controller 50 determines an error at Block 52, then generates control signals (e.g., using a PI gain control Block 54) to maintain a relatively constant interaction between the tip and sample (or deflection of the cantilever 30), typically to maintain a setpoint characteristic of the oscillation of probe 28. The control signals are typically amplified by a high voltage amplifier 56 prior to, for example, driving scanner 34. For example, controller 50 is often used to maintain the oscillation amplitude at a setpoint value, $A_S$, to insure a generally constant force between the tip and sample. Alternatively, a setpoint phase or frequency may be used. Controller 50 is also referred to generally as feedback where the control effort is to maintain a constant target value defined by setpoint.

A workstation 60 is also provided, in the controller 50 and/or in a separate controller or system of connected or stand-alone controllers, that receives the collected data from the controller 50 and that manipulates the data obtained during scanning to perform data manipulation operating such as point selection, curve fitting, and distance determining operations. The workstation 60 can store the resulting information in memory, use it for additional calculations, and/or display it on a suitable monitor, and/or transmit it to another computer or device by wire or wirelessly. The memory may comprise any computer readable data storage medium, examples including but not limited to a computer RAM, hard disk, network storage, a flash drive, or a CD ROM.

AFMs may be designed to operate in a variety of modes, including contact mode and oscillating mode. Operation involves moving the sample and/or the probe assembly up and down relatively perpendicular to the surface of the sample in response to a deflection of the cantilever of the probe assembly as it is scanned across the surface. As discussed briefly above, scanning typically occurs in an "X-Y" plane that is at least generally parallel to the surface of the sample, and the vertical movement occurs in the "Z" direction that is perpendicular to the X-Y plane. Note that many samples have roughness, curvature and tilt that deviate from a flat plane, hence justifying the use of the term "generally parallel." In this way, the data associated with this vertical motion can be stored and/or used to construct an image of the sample surface corresponding to the sample characteristic being measured, e.g., surface topography. In one practical mode of AFM operation, known as TappingMode™ AFM (TappingMode™ is a trademark of the present assignee), the tip is oscillated at or near a resonant frequency of the associated cantilever of the probe, or harmonic thereof. A feedback loop attempts to keep the amplitude of this oscillation constant to minimize the "tracking force," i.e., the force resulting from tip/sample interaction, typically by controlling tip-sample separation (a controlled distance between the probe and sample). Alternative feedback arrangements keep the phase or oscillation frequency constant. As in contact mode, these feedback signals are then collected, stored and used as data to characterize the sample.

Using an AFM 26 configured as described above, sample features in the order of 0.5 angstrom can be resolved at high quality while scanning along lines of 30 micrometers or longer at rates exceeding 5 Hz and even exceeding 10 Hz. The system's preferred forced feedback control, including the z actuator of the actuator assembly 34, the controller 50, and the detector 42, preferably permits the scan rates to be achieved at a forced control bandwidth of 7 to 10 kilohertz or more at tapping mode and 30 kilohertz or more in contact mode. As a result, an extremely high data density (5000×5000 pixels) scan of a 30 micrometer×30 micrometer scan area can be performed in just over 8 minutes, as compared to over 80 minutes for prior AFMs. An acceptable AFM is disclosed in U.S. Pat. No. 7,770,213 (the '213 patent), assigned to the assignee of the present application, the contents of which are incorporated by reference herein.

The cameras 22 and 24 also are coupled to the workstation 60, preferably so as to be capable of sharing data with each other and with the AFM 26. They also preferably are controllable at least in part by a common manually operated controller such as a mouse, facilitating integration of the control and operations of the cameras 22 and 24 and the AFM 26 into a common assembly that facilitates operation of the assembly 20 as a whole.

Referring now to FIG. 3, the translation stage 70 bears a chuck 72 for supporting the sample 36. The range of motion of the translation stage 70 in XY should be sufficiently high to permit movement between the field of views of the cameras 22 and 24 and the AFM 26. It also should be sufficiently precise to permit precise positioning of the region of interest within the various fields of views and, most notably, within the scan range of the AFM 26. A variety of scan stages are suitable for this purpose. For example, the translation stage 70 could include nested actuators including a coarse positioner for moving the sample 36 between the various instruments 22, 24, and 26, and a fine positioner for positioning the region of interest within the SPM's scan range. Alternatively, a single actuator having both sufficient range and precision for both functions could be employed. The translation stage 70 preferably has a range of movement, for example, 300 mm or more while having a high level of precision. The translation stage 70 may, if desired, also be capable of at least limited z movement. Control of the translation stage 70 may be initiated automatically by the workstation 60 and/or manually using suitable controls.

Of course, as mentioned above, some or all of the functionality of the translation stage 70 could be integrated into a structure for translating the cameras 22 and/or 24 and/or the AFM 26 instead of or in addition to translating the sample 36, so long as the necessary relative movement between the sample 36 and the devices 22, 24, and 26 is achieved.

The cameras 22 and 24 will now be described. The term "camera", as applied to both the low magnification camera 22 and the high magnification camera 24, encompasses the associated camera per se as well as the associated lenses and optics used to illuminate and magnify and otherwise manipulate images being acquired by the camera. It also encompasses actuators and internal electronics for controlling functions, such as zoom or pan, often found in cameras. Both cameras 22 and 24 preferably comprise digital cameras.

The low magnification or wide view camera 22 preferably has a field of view that is at least approximately as large as the sample chuck that is accessible by the AFM in order to allow the user to navigate to a region of interest in a sample without requiring the user to manually inspect the chuck. Current automated may have a chuck diameter as small as 8 mm and a sample puck diameter of at least 12 mm. Hence, the low magnification camera should have a field of view of at least 12 mm and preferably considerably higher—in excess of 50 mm. However, since field of view is typically somewhat inversely related to resolution, the field of view should not be so large so as to reduce resolution to the point that accurate identification of the region of interest is hindered. The currently preferred resolution is of at least 100 and more preferably of at least 250 micrometer line-pair resolution in order to permit the user to navigate between the low magnification camera and the high magnification camera for most samples. Currently available cameras have a resolution in this order have a maximum field of view of on the order of 150 mm or higher and even 200 mm or higher.

It should be noted that the field of view of camera 22 could be much larger in order to image larger samples, such as a 450 mm wide semiconductor wafer. The resulting camera would have resolution on the order of 470 um (1 part in 960 resolution, lens limited).

The low magnification camera 22 (sometimes called a "wide view" or wide field" camera) preferably has an optical and/or digital zoom capability of from 5 to 1 and 20 to 1 and more preferably of about 10 to 1. It should be noted that, due to the digital nature of the camera 22, the resolution and field of view may be constant, but the magnification can be varied simply by stretching the image without obtaining any new information. A suitable camera and lens combination is a digital 5 megapixel camera with a 16 mm lens, permitting the resolution of a feature as small as 125 micrometers. A suitable camera is available from IDS under Model No. UI-1485LE, and a suitable lens is available from KOWA under Model No. LM16JCM. This camera has 120 line pair per mm resolution, which corresponds to about 40 microns maximum resolution with a large ⅔"CCD. Other wide field cameras are conceivable that can resolve features of about 20 microns.

The optics of the high magnification camera 24 (sometimes called a "narrow view" or "narrow field" camera) may move independently of the AFM 26 or may move with the AFM 26 to provide a "tracking objective." The desire to minimize the weight of this tracking objective in order to maximize the scale and speed of the AFM provides a practical limit on how wide a field of view the camera can have. If the camera 24 moves with AFM 26, it preferably has a field of view on the order of 1 mm and a resolution on the order of 2.5 micrometer line-pair resolution. A camera having this field of view/resolution combination can be achieved using the above-described IDS 5 megapixel camera in combination with custom optics. Providing such a camera in combination with an AFM having a 30 micrometer maximum scan range provides a 12:1 resolution ratio (30 micrometer/2.5 micrometer), which is adequate for navigating between the high magnification optics and the scanned AFM image.

The AFM 26 of this embodiment preferably comprises a tip-scanner based AFM with a tracking objective. The high magnification camera 24 may move with the tracking objective or be mounted on the AFM frame apart from the scanner.

Regardless of the fields of view of the various instruments 22, 24, 26 and their respective resolutions, each wider field instrument should have a resolution at least as small, and preferably at least about ten times smaller, than the field of view of the associated narrower field instrument. Hence, in this system, the low magnification camera 22 preferably has a resolution at least ten times smaller than the field of view of the high magnification camera 24, and the high magnification camera preferably has a resolution at least ten times smaller than the scan range of the AFM 26.

Figure 4:
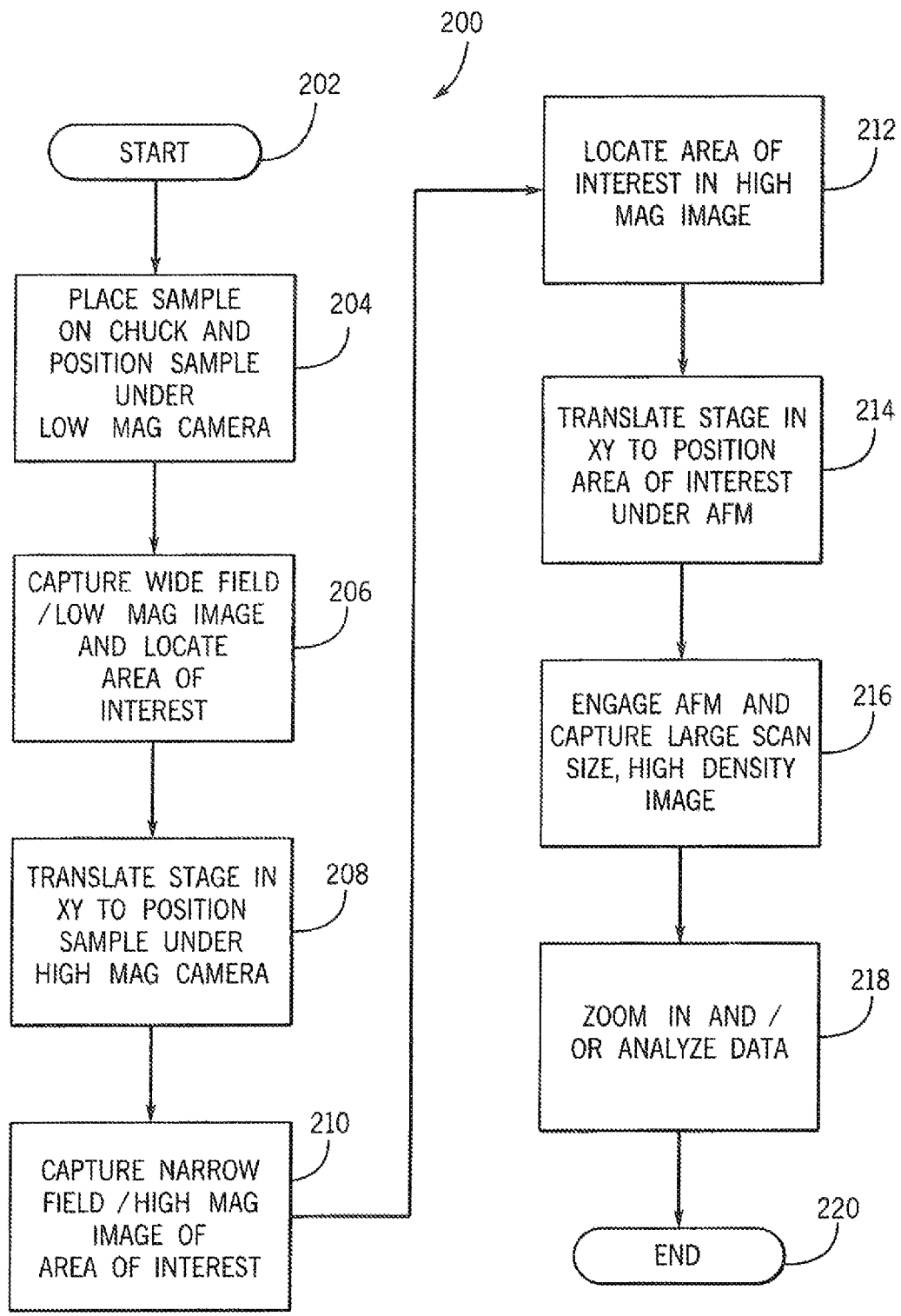
FIG. 4 is a flowchart of a process for acquiring high density data concerning a feature of interest of a sample using the SPM assembly of FIGS. 2 and 3.
Figure 5:
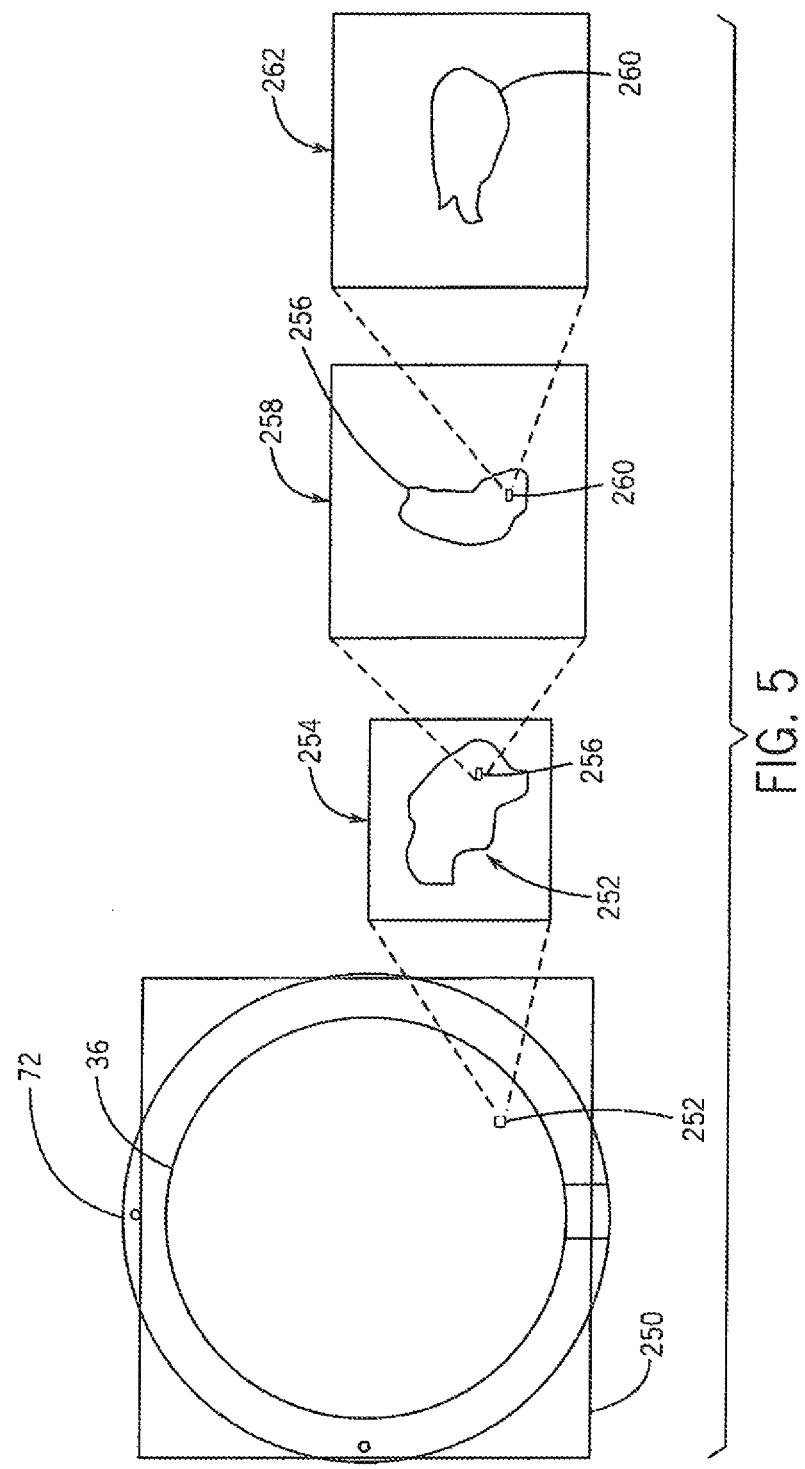
FIG. 5 schematically represents images generated by the cameras and SPM of the SPM assembly of FIGS. 2 and 3.

Turning now to FIG. 4 with occasional reference to FIG. 5, a process 200 for rapidly capturing high density data using the AFM assembly 20 of FIGS. 2 and 3 proceeds from START in Block 202 to Block 204, where the user places the sample 36 on the chuck 72 and, if necessary, controls the translation stage 70 of FIGS. 2 and 3 to position the sample 36 within the field of view of the low magnification camera 22. The low magnification camera's field of view 22 is seen at 250 in FIG. 5. The field of view 250 preferably is more than about 50 mm, more preferably more than about 150 mm, and even more preferably on the order of about 200 mm or higher. The low magnification camera 22 then captures the image of the sample in Block 206. The user then identifies an area containing the region interest such as, by positioning a cursor on the image of the region using a mouse by any other suitable technique. The identification of the area of interest can be performed by viewing the low magnification image of the sample with the naked eye or with the help of pattern recognition. The user then selects the area of interest for further viewing by, for instance, clicking a mouse with the cursor positioned over the area. The area of interest (252 in FIG. 5) may have a maximum dimension that is about the same as the field of view of the narrow field camera 24, and thus should be no more 10 mm, more typically no more than about 8 mm, and more typically on the order of 1.0 to 2.0 mm.

The translation stage 70 is then actuated to position the area of interest 252 under the high magnification camera in Block 208. This translation preferably is performed automatically upon clicking the mouse under control of the workstation 60 or by other manual or automatic operation. Translation preferably centers the area of interest 252 within the field of view of camera 24, using the pre-recorded results of the calibration procedure described below to collocate the region of interest within both images. This centering of the area of interest 252 within the field of view 254 of the camera 24 is shown in FIG. 5. A high magnification, narrow field image of the area of interest is then viewed and/or acquired in Block 210. Next, in Block 212, the region of interest (256 in FIG. 5) is located in the high magnification image 254. In the case in which the objective of the narrow field camera 24 moves in Z with the AFM scanner, an initial step of this operation typically involves focusing the high magnification image by moving the AFM scanner in Z. One possible technique is to move the AFM down from its uppermost position toward the sample surface until the video image of the camera 24 comes into focus. Alternatively, if the sample is of a known height, or if multiple samples of the same height are being measured, the AFM can simply be lowered down to a position in which the video image of camera 24 is known to be in focus. As still another alternative, a video autofocuser, a laser surface sensor, or any other suitable device or technique can be used to focus the optics of the camera 24 on the sample surface.

As discussed briefly above, the high magnification camera 24 and operations associated therewith can be effectively integrated into the low magnification camera 22 if the low magnification camera 22 has sufficient zoom capability to permit the user to locate the area of interest in a large field view, then zoom in on that area of interest to create a narrow field view, then locate the region of interest in the narrow field view. In this case, the optical instrument may comprise a single camera. One zoom accessory usable with wide field cameras that can generate this capability is commercially available from Navistar of Rochester, N.Y. under the tradename "Navitar 12×" zoom system and that has horizontal fields of view of 55 mm to 4.6 mm.

Figure 6:
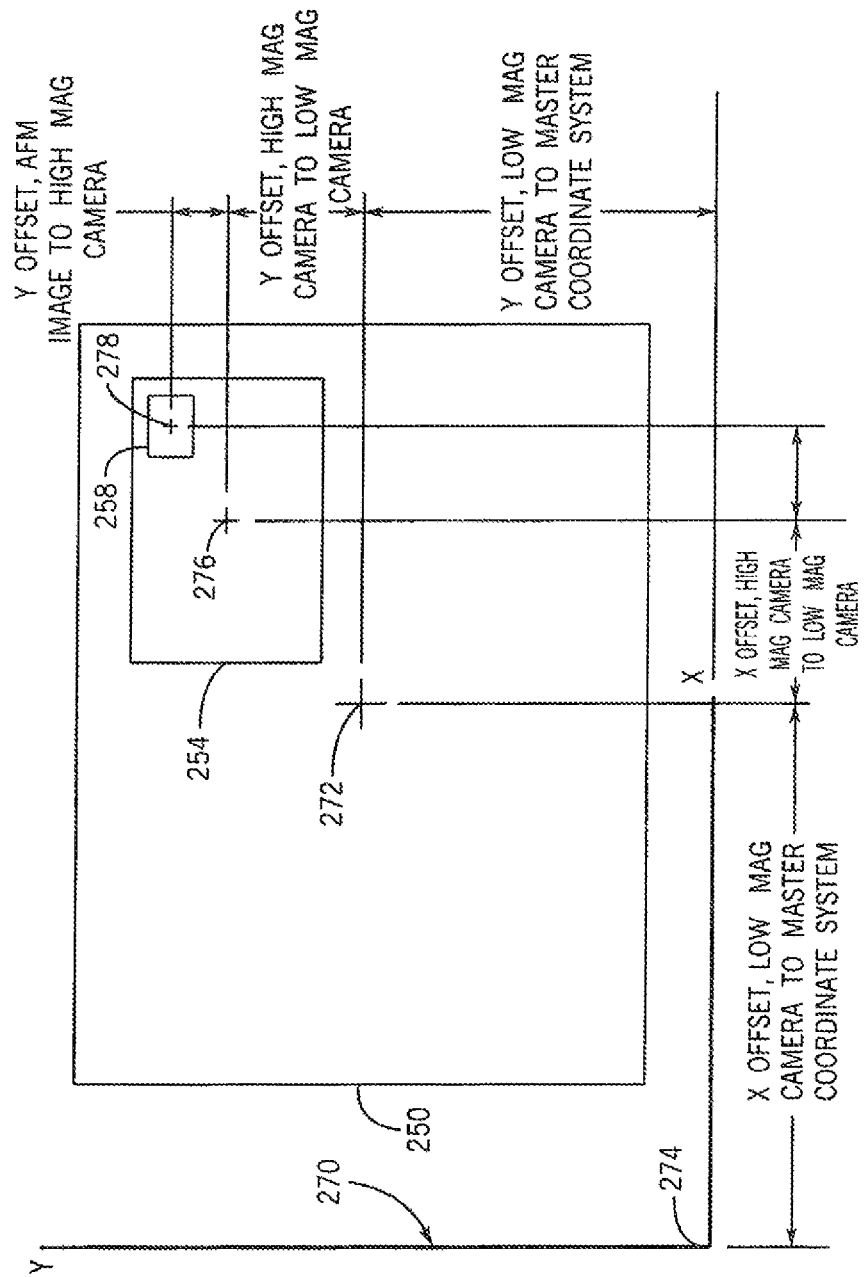
FIG. 6 schematically represents offsets in X and Y of the various instruments of the SPM assembly of FIGS. 2 and 3 between one another and a master coordinate system.

Next, in Block 214, the translation stage 70 is moved in XY as necessary to center the region of interest 256 with the AFM scan area 258 in FIG. 5 or to otherwise place it in predetermined location with the AFM's scan area, again relying on the results of a calibration procedure such as the one discussed below in conjunction with FIGS. 6-8 to collocate the two images. This movement may be performed manually while viewing the image provided by the high magnification camera 24. Alternatively, the user may position a cursor on the region of interest and click a mouse or otherwise trigger an auto-translate operation, whereupon the translation stage 70 (FIG. 3) will automatically move to that position. Alternatively, video pattern recognition may be used to identify the feature in the video image and position that feature with the AFM probe's scan range under the AFM probe. As still another alternative, the user could control a cursor to draw a box on the area to scan, and the AFM can use the box size as the AFM scan size.

Next, in Block 216, the AFM probe 28 is controlled to engage the sample 36 and to capture a large scan size, high data density image of the region of interest 256. The scanned areas containing the region of interest 256 is preferably on the order by 30 micrometers by 30 micrometers but could be larger, and the data density is preferably in excess of 512×512 pixels, higher than of 1000×1000 pixels, and even up to 5000×5000 pixels. SPMs with considerably larger scan ranges are available but scan at slower speeds. As discussed above, this data can be acquired at least 10 times faster than the same quantity of data could be acquired using earlier AFM probes, permitting the entire area to be scanned in a period of time that not only is much more acceptable to the user in general, but that also reduces or eliminates the effects of drift on the acquired data. Using the AFM probe described in the '213 patent, data having a density of 5000×5000 pixels can be acquired in less than 15 minutes and even on the order of 8 minutes. Since the region of interest 256 can be located and placed within the AFM probe's scan area 258 within a matter of, at most, a few minutes, a feature of interest within that region can be easily located, placed within the scan area of an AFM probe, and scanned with an extremely high data density in a matter of about 10 to 20 minutes, a small fraction of the time typically required using prior art systems and processes. The scan may be a raster scan in which data is taken along lines in the X direction that are closely spaced in the Y. A raster scan taken along lines in the Y direction that are spaced in X also could be performed. Still other scan patterns could be employed for the scan as well. Images of the same feature having a data density of about 1024×1024 pixels, which is still sufficiently dense to permit the user to zoom in on a captured area and still provide useful results, can be obtained only 2-3 minutes. Stated another way, 1000 lines of data of sufficiently high density (e.g., 1024×1024 pixels) can be obtained in just 1.6 minutes, as opposed to 16 minutes with a typical prior AFM probe.

After the data has been captured, the user can simply zoom in and/or analyze the captured data by manipulation of the cursor and mouse button or other suitable device to select one or more specific features of interest as shown in Block 218. The zooming in on one such feature of interest 260 within a zoomed-in area 262 is shown in FIG. 5. The process then proceeds to END in Block 220.

For a SPM assembly of a given configuration, offsets may be created between the data acquired the low magnification camera 22 and the high magnification camera 24, and between the high magnification camera 26 and the AFM 26 due to misalignments of the instruments 22, 24, and 26 relative to each other and to any given reference point. These offsets may occur in any or all X, Y, Z, and θ, where θ is the angular difference between the fields of view of the instruments. Offsets of reference locations of each of the instruments 22, 24, and 26 in X and Y, relative to one another and relative to a reference coordinate system are illustrated schematically in FIG. 6. The reference location of each instrument 22, 24, and 26 is the center of an acquirable image, corresponding to the center of the field of view for each of the cameras 22 and 24 and the center of the scan area for the SPM 26. Another reference location could be used as easily. More specifically, FIG. 6 shows the offsets between the images 250, 254, and 258 acquired by the low magnification camera 22, the high magnification camera 24, and the AFM 26, respectively, relative to the center of a master coordinate system 270. Specifically, the center 272 of the low magnification camera image 250 and the corresponding field of view are offset in X and Y from the center 274 of the master coordinate system 270, the center 276 of the high magnification camera image 254 and the corresponding field of view offset in X and Y from the center 272 of image 250 and from the center 274 of the master coordinate system, and the center 278 of the AFM scan area 258 and the corresponding field of view are offset in X and Y from all three centers 272, 274, and 276.

The calibration of the offsets between the cameras 22 and 24 and the AFM 26 is important in order to collocate the images acquired by the various instruments 22, 24, and 26 and thus to permit the user to go back and forth between the images displayed by the cameras 22 and 24 and the AFM 26 while still looking at the same region of interest. Specifically, once these offsets are known, they can be transformed into a master coordinate system that can be used regardless of differences in coordinate system employed by the particular instrument being used at that particular time. The master coordinate system could be aligned with any or all of the various instruments' coordinate systems. Alternatively, different coordinate systems could be used for each instrument, and the calibrated offsets could be used to align the coordinate systems to one another.

Calibration also preferably includes, for each instrument, a determination of the location of a selected "spot" within the field of view relative the to the reference location. For example, for a given location or spot that is selected within the field of view of the low magnification camera 22, the system 20 needs to be calibrated to determine the distance in X and Y between that spot and the center 272 of the field of view 250 of the low magnification camera 22.

Figure 7:
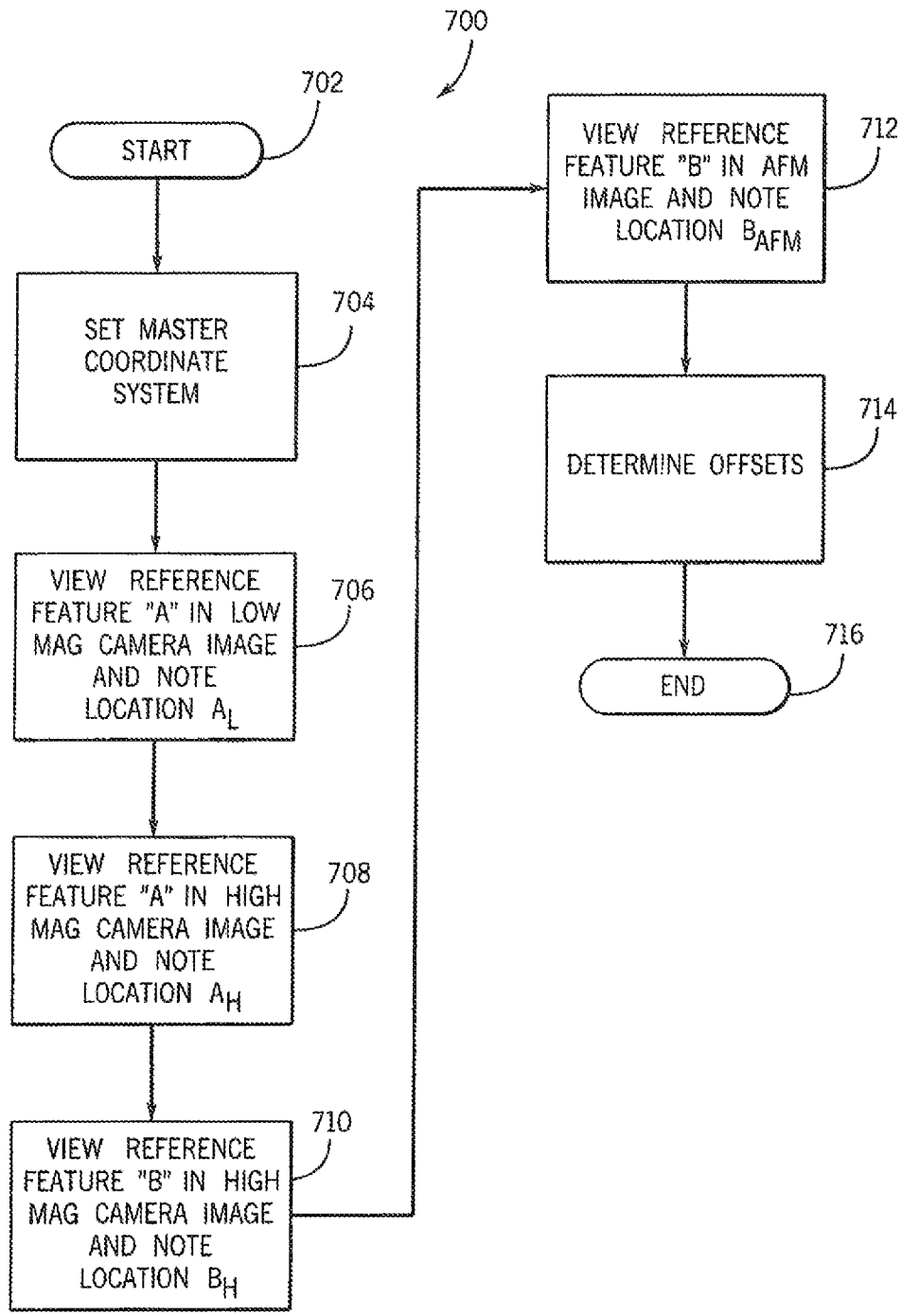
FIG. 7 is a flowchart of a technique for calibrating the SPM assembly of FIGS. 2 and 3 to compensate for the offsets illustrated schematically in FIG. 6, permitting collocation of images acquired by the various instruments.
Figure 8:
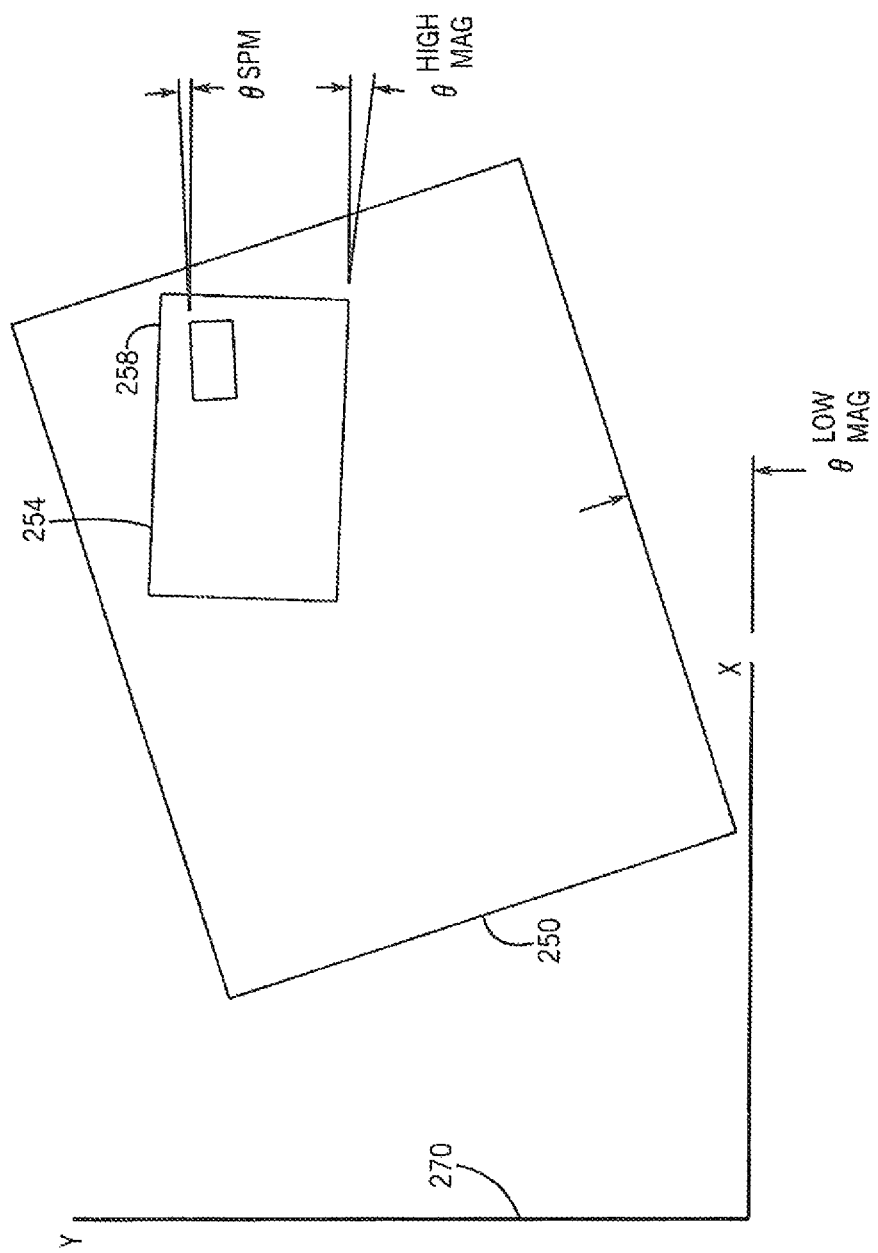
FIG. 8 schematically represents angular offsets between the coordinates of the various instruments of the SPM assembly of FIGS. 2 and 3 and a master coordinate system.

Still referring to FIG. 7, a process 700 for calibrating for the offsets of the centers of views of the instruments 22, 24, 26 with respect to one another and to the master coordinate system is illustrated. This process will be valid for a given SPM assembly configuration, i.e., for so long as the noted offsets remain static, which typically will be the case unless and until one of the instruments is physically altered, such as by the replacement of a lens on one of the cameras 22 or 24 or the replacement of a probe on the SPM 26. Calibration requires the determination of the location of center of view of each instrument relative to that of one other instrument and the determination of the location of the center of view of at least one instrument relative to the center of the master coordinate system.

In the example shown in FIG. 7, the process 700 proceeds from START in Block 702 to Block 704 in which the origin of the master coordinate system is determined. This determination requires only knowledge of the absolute position of the translation stage 70 within the SPM assembly 20. This location is known automatically in a system having a translation stage that does not require initialization and requires only moving the stage to its X and Y limits or some other reference point such as a linear encoder reference mark in a stage requiring initialization.

Then, in Blocks 704 and 706, the location of a feature "A" on a reference sample viewable by both cameras 22 and 24 is determined relative to the center of the field of view of each instrument 22 and 24. The feature A is preferably two-dimensional, such as a line, permitting calculation for θ-offset as discussed below in conjunction with FIG. 8. The location of different feature "B", on the same or a different reference sample, also preferably being two-dimensional, is determined relative to the center of view of the respective instruments 24 and 26 in Blocks 710 and 712. Then, in Block, 714, the information acquired from the previous Blocks is used to determine the offset between the center of the field of view in each instrument with respect to at least one other instrument, and the offset between the center of view of one of these instruments and the center of the master coordinate system is determined. For example, the offset between the center of the fields of view of the low magnification camera 22 and the high magnification camera 24 and between the high magnification camera 24 and the SPM 26 may be determined, as well as the offset of the center of the field of view of the SPM 26 and the center of the master coordinate system. Once these values are known, it is a simple manner to calculate the locations of all three instruments 22, 24, 26 relative to each other and relative to the central coordinate system 270.

The process then ENDs in Block 716.

Calibration for actual distance in terms of X and Y for any selected "spot" and the center of the field of view of each instrument 22, 24, and 26 also can be performed in a manner which is, per se, well known either before or after this calibration procedure.

It should be noted that, in addition to being offset from one another in X and Y, the various images can and typically would be angularly offset from one another and from the master coordinate system by angles (θ). These offsets are illustrated in FIG. 8, which illustrates that the images 250, 254, and 258 representing the fields of view of the low magnification camera 22, the high magnification camera 24, and the SPM 26 are offset from the center of the master coordinate system 270 by respective angles $\theta_{LOW\,MAG}$, $\theta_{HIGH\,MAG}$, and $\theta_{SPM}$. The offsets preferably are calibrated to permit the desired collocation of the various images, possibly by using a procedure analogous to that discussed above in connection with FIG. 7.

Calibration for angular position in terms of θ for any selected "spot" and the center of the field of view of each instrument 22, 24, and 26 also can be performed in a manner which is, per se, well known, either before or after this calibration procedure.

Of course, calibration techniques could be used other than the use of a master coordinate system. If a master coordinate system is used, it need not be Cartesian based but could, for instance, use a polar coordinate system.

As a result of these calibrations, a user is able to scroll at will between an extreme close-up view of all or part of the region of interest to an extreme wide angle view of a dramatically larger area containing that region with ease—not unlike the capabilities a user of "Google Earth®" experiences when altering between a street view of a given building, an aerial view of a town containing that building, and a satellite view of a the region containing that town. The images can be viewed in any order, such as switching directly between the SPM view and the wide field camera view. This scrolling would not be possible without collocating the various images by calibrating for the offsets between the various instruments' fields of view.

Although the best mode contemplated by the inventors of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept. The scope of some of these changes is discussed above. The scope of other changes to the described embodiments that fall within the present invention but that are not specifically discussed above will become apparent from the appended claims and other attachments

I claim:

1. A method of operating a scanning probe microscope (SPM) assembly having a wide field image acquisition device and an SPM, the wide field image acquisition device having a field of view having a maximum dimension of at least 12 mm, and the SPM having a scan range having a maximum dimension of no more than 200 microns:
    calibrating the wide field image acquisition device and the SPM so that the field of view of the wide field image acquisition device and the scan range of the SPM are collocated;
    placing a sample within the field of view of the wide field image acquisition device;
    using the wide field image acquisition device, locating a region of interest on the sample surface having a maximum dimension of less than 200 microns;
    effecting relative sample/SPM assembly movement to position the region of interest within the scan range of the SPM; and
    scanning the region of interest with a probe of the SPM and acquiring data while monitoring interaction between the probe and the sample.

2. The method of claim 1, wherein the wide field image acquisition device comprises an optical instrument including a first, wide field camera.

3. The method of claim 2, wherein
    the optical instrument further comprises a second, narrow field camera having a field of view having a maximum dimension of no more than 10 mm, wherein
the collocating step collocates the fields of view of the first and second cameras and the scan range of the SPM with one another, wherein
    the region of interest is contained in a larger area of interest having a maximum dimension of no more than about 10 mm, and wherein
    the first locating step comprises 1) locating the area of interest using the first camera, 2) repositioning the area of interest within the field of view of the second camera, and 3) using the second camera, locating the region of interest.

4. The method of claim 3, wherein the first camera has a resolution of no more than 20 microns.

5. The method of claim 4, wherein the field of view of the first camera has a maximum dimension of at least 50 mm.

6. The method of claim 5, wherein the field of view of the first camera has a maximum dimension of at least 150 mm.

7. The method of claim 2, wherein the second camera has a resolution of no more than about 4 microns.

8. The method of claim 3, wherein the field of view of the second camera has a maximum dimension of no more than about 4 mm.

9. The method of claim 8, wherein the field of view of the second camera has a maximum dimension of no more than about 2 mm.

10. The method of claim 3, wherein the SPM has a scan range of no more than 50 microns.

11. The method of claim 3, wherein the first camera has a resolution smaller than the field of view of the second camera and the second camera has a resolution smaller than the scan range of the SPM.

12. The method of claim 11, wherein the first camera has a resolution at least ten times smaller than the field of view of the second camera and the second camera has a resolution at least ten times smaller than the scan range of the SPM.

13. The method of claim 2, wherein the optical instrument is a zoomable camera, and wherein the step of locating the region of interest comprises first locating arm area of interest on the sample surface, the area of interest containing the region of interest and having a maximum dimension of no more than about 10 mm, then zooming in on the area of interest and locating the region of interest within the area of interest.

14. The method of claim 1, wherein the wide field image acquisition device comprises an optical instrument, and wherein the collocating step comprises, for a given SPM assembly configuration, calibrating the SPM assembly by determining offsets of a field of view of the optical instrument and the scan range of the SPM from each other.

15. The method of claim 14, wherein the determining step comprises determining offsets of the field of view of the optical instrument and the scan range of the scan range of the SPM from one another in X and Y from a master Cartesian coordinate system.

16. The method of claim 14, wherein the determining step additionally comprises, for the given SPM assembly configuration, determining an angular offset of the optical instrument from and the SPM from one another in θ.

17. The method of claim 1, wherein the scanning operation is performed at a rate of at least 5 Hz with a resolution of at least 512×512 pixels, and wherein the method requires less than 10 minutes to complete.

18. The method of claim 1, further comprising acquiring and collocating images of the sample using data acquired from the wide field image acquisition device and the SPM and scrolling between the acquired and collocated images.

19. A method of operating a scanning probe microscope (SPM) assembly having first and second cameras and an SPM, the first camera having a field of view having a maximum dimension of at least 12 mm, the second camera having a field of view having a maximum dimension of no more than 10 mm, and the SPM having a scan range having a maximum dimension of no more than 200 microns, the method comprising:

calibrating the first and second cameras and the SPM so that fields of view of the first and second cameras and the scan range of the SPM are all collocated with one another;

positioning a sample within the field of view of the first camera;

using the first camera, locating an area of interest on the sample surface having a maximum dimension of less than 10 mm;

effecting relative sample/SPM assembly movement to position the area of interest within the field of view of the second camera;

using the second camera, locating a region of interest within the area of interest, the region of interest having a maximum dimension of no more than 200 microns, and effecting relative sample/SPM assembly movement to position the region of interest within the scan range of the SPM;

scanning the region of interest with a probe of the SPM and acquiring data while monitoring interaction between the probe and the sample.

20. The method of claim 19, wherein the first camera has a field of view having a maximum dimension of greater than 50 mm, the second camera has a field of view having a maximum dimension of less than about 4 mm, and the SPM has a scan range of no more than about 30 microns.

21. The method of claim 19, wherein the first camera has a resolution at least ten times smaller than the field of view of the second camera and the second camera has a resolution at least ten times smaller than the scan range of the SPM.

22. A scanning probe microscope (SPM) assembly comprising:

a wide field image acquisition device, the wide field image acquisition device having a field of view having a maximum dimension of at least 12 mm;

a SPM having a scan range having a maximum dimension of no more than 200 microns, the wide field image acquisition device and the SPM being calibrated so that the field of view of the wide field image acquisition device and the scan range of the SPM are collocated;

a translation stage that moves at least one of a sample, the wide field image acquisition device, and the SPM to selectively position the sample in the field of view of the wide field image acquisition device and the scan range of the SPM; and a programmed computer to which the wide field image acquisition device and the SPM are coupled and which permits a region of interest on the sample, located via operation of the wide field image acquisition device, to be scanned via the SPM.

23. The SPM assembly of claim 22, wherein the wide field image acquisition device comprises an optical instrument including a first, wide field camera.

24. The SPM assembly of claim 23, wherein
the optical instrument further comprises a second, narrow field camera having a field of view having a maximum dimension of no more than 10 mm, wherein the fields of view of the first and second cameras and the scan range of the SPM are all collocated with one another, wherein
the translation stage selectively positions the sample in the field of view of the narrow field camera, and wherein
the programmed computer permits an area of interest containing the region of interest to be located by the wide field camera and viewed by the narrow field camera and permits the region of interest to be located by the narrow field camera and scanned via the SPM.

25. The SPM assembly of claim 24, wherein the field of view of the first camera has a maximum dimension of at least 50 mm.

26. The SPM assembly of claim 25, wherein the field of view of the first camera has a maximum dimension of at least 150 mm.

27. The SPM assembly of claim 24, wherein the field of view of the second camera has a maximum dimension of no more than about 4 mm.

28. The SPM assembly of claim 27, wherein the field of view of the second camera has a maximum dimension of no more than about 2 mm.

29. The SPM assembly of claim 24, wherein the SPM has a scan range of no more than 50 microns.

30. The SPM assembly of claim 24, wherein the first camera has a resolution smaller than the field of view of the second camera and the second camera has a resolution smaller than the scan range of the SPM.

31. The SPM assembly of claim 30, wherein the first camera has a resolution at least ten times smaller than the field of view of the second camera and the second camera has a resolution at least ten times smaller than the scan range of the SPM.

\* \* \* \* \*

UNITED STATES PATENT AND TRADEMARK OFFICE
CERTIFICATE OF CORRECTION

PATENT NO.         : 9,081,028 B2
APPLICATION NO.    : 14/386511
DATED              : July 14, 2015
INVENTOR(S)        : Meyer Page 1 of 1

It is certified that error appears in the above-identified patent and that said Letters Patent is hereby corrected as shown below:

IN THE CLAIMS

CLAIM 15, Line 3        Delete "of the scan range"

Col. 15, Line 44

Signed and Sealed this
Twenty-fourth Day of November, 2015

Michelle K. Lee
*Director of the United States Patent and Trademark Office*